US012583087B2

(12) United States Patent
Yoshikane et al.

(10) Patent No.: US 12,583,087 B2
(45) Date of Patent: Mar. 24, 2026

(54) DRIVING TOOL

(71) Applicant: MAKITA CORPORATION, Anjo (JP)

(72) Inventors: Kiyonobu Yoshikane, Anjo (JP); Makito Teramoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/404,493

(22) Filed: Jan. 4, 2024

(65) Prior Publication Data

US 2024/0246214 A1 Jul. 25, 2024

(30) Foreign Application Priority Data

Jan. 20, 2023 (JP) ................................ 2023-007293

(51) Int. Cl.
*B25C 5/13* (2006.01)
*B25C 5/06* (2006.01)
*B25C 5/15* (2006.01)

(52) U.S. Cl.
CPC .................. *B25C 5/13* (2013.01); *B25C 5/15* (2013.01); *B25C 5/06* (2013.01)

(58) Field of Classification Search
CPC .... B25C 5/13; B25C 5/15; B25C 5/06; B25C 1/047; B25C 1/06; B25C 1/04; B25C 1/001
USPC ........................................................ 227/130
See application file for complete search history.

(56) References Cited

U.S. PATENT DOCUMENTS

| | | | | |
|---|---|---|---|---|
| 2,733,440 A * | 2/1956 | Jenny | B25C 5/1665 | 227/123 |
| 2,801,415 A * | 8/1957 | Jenny | B25C 5/16 | 227/123 |
| 4,304,349 A * | 12/1981 | Novak | B25C 1/005 | 206/338 |
| 4,380,312 A * | 4/1983 | Landrus | B25C 5/06 | 227/139 |
| 7,284,685 B1 * | 10/2007 | Wojcicki | B25C 1/005 | 227/119 |
| 10,836,024 B2 * | 11/2020 | Young | B25C 5/06 | |
| 11,654,540 B2 * | 5/2023 | Garces | B25C 1/06 | 227/130 |
| 2006/0011692 A1 * | 1/2006 | Ishizawa | B25C 1/047 | 227/8 |

(Continued)

FOREIGN PATENT DOCUMENTS

| | | | |
|---|---|---|---|
| JP | 2000-202783 A | | 7/2000 |
| JP | 2009255272 A | * | 11/2009 |

*Primary Examiner* — Stephen F. Gerrity
*Assistant Examiner* — Katie L Gerth
(74) *Attorney, Agent, or Firm* — Cliff PLC

(57) ABSTRACT

A driving tool includes a head-guide surface and a pair of leg-guide grooves, both are formed in a driving passage extending in a driving direction. The head-guide surface slidably guides a head of a U-shaped driving member. Each of the pair of leg-guide grooves is recessed from the head-guide surface toward a side of a first end surface of a tool main body. Legs of the driving member enter the leg-guide grooves. The driving member is driven in an inclined posture in which the legs enter the leg-guide groove, thereby avoiding a slipping off posture in which a driver is deviated from the driving member owing to a reaction force occurred when the driving member is driven by the driver.

20 Claims, 11 Drawing Sheets

(56) References Cited

U.S. PATENT DOCUMENTS

| | | | | |
|---|---|---|---|---|
| 2008/0156844 | A1* | 7/2008 | Braganza | B25C 5/06 227/120 |
| 2013/0098963 | A1* | 4/2013 | Gardner | B25C 5/15 227/110 |
| 2015/0048138 | A1* | 2/2015 | Chen | B25C 5/1658 227/109 |
| 2018/0015600 | A1* | 1/2018 | Akiba | B25C 1/06 |
| 2020/0246949 | A1* | 8/2020 | Mikat-Stevens | B25C 1/041 |
| 2021/0138623 | A1* | 5/2021 | Bierdeman | B25C 1/06 |
| 2021/0379747 | A1* | 12/2021 | Mikat-Stevens | B25C 1/041 |
| 2024/0051106 | A1* | 2/2024 | Yang | B25C 5/1627 |

* cited by examiner

DRIVING TOOL

CROSS-REFERENCE

This application claims priority to Japanese patent application serial number 2023-007293, filed on Jan. 20, 2023, the contents of which are incorporated herein by reference in their entirety for all purposes.

TECHNICAL FIELD

The present invention generally relates to a driving tool for driving a driving member, such as a nail or a staple, into a workpiece, such as, for example, a wooden material.

BACKGROUND ART

For example, a compressed-air-driven tacker (stapler) is known. Compressed-air-driven tackers (staplers) may utilize, for example, a pressure of a compressed air for moving a piston in a downward direction. A compressed-air-driven tacker (stapler) may include a driver that is integrally connected to the piston. By a downward movement of the piston, the driver may move within a driving passage, thereby driving (and/or striking) a U-shaped driving member, for example, a staple. The driving member may be ejected from a tip end of the driving passage (ejection port) of the driving tool.

When a U-shaped staple is driven in the above-described tacker (stapler), a larger reaction force may be generated in comparison with a nail driver (nailer) in which a bar-shaped nail is driven. Because of this, a driving posture of the driving member becomes unstable to cause the driver to be deviated from (come off) a head of the driving member when the driving member is ejected from an ejection port of the driving tool, may often occur (hereinafter referred to as "slipping off posture"). When the slipping off posture occurs, a driving force of the driver that drives/strikes the driving member may be weak to cause a driving failure. Also, since the driver is deviated from a head of the staple, it may often happen that the driver hits a workpiece to cause it to be directly damaged by the driver. In the prior art, with respect to a driving tool (nailer) in which a bar-shaped driving member is driven, the bar-shaped driving member is configured to be tilted in the driving passage to prevent occurrence of the slipping off posture. In the present disclosure, a driving tool (stapler) is taught to have a stable driving operation to prevent a driven stapler from being slipped off. Also, a workpiece can be prevented from damaging.

SUMMARY

According to one aspect of the present disclosure, a driving tool comprises a tool main body including a first end surface, and also comprises a driving passage which extends in a driving direction and to which a U-shaped driving member having a head and two legs is supplied from a direction opposite to the first end surface. The driving tool also comprises a driver that moves along the driving passage to drive the driving member. The driving tool also comprises a head-guide surface that is formed in the driving passage and that slidably guides the head of the driving member. The driving tool also comprises a pair of leg-guide grooves, each of which is recessed from the head-guide surface toward a side of the first end surface and extends in the driving direction. The two legs of the driving member are configured to enter the pair of leg-guide grooves.

Because of this configuration, the driving member is ejected from the ejection port in an inclined posture in which a tip end of the leg of the driving member is deviated toward a side of the first end surface. Owing to a reaction force occurred when the driving member is ejected, the ejection port is deviated toward the side of the first end surface, and accordingly, a direction in which the driver moves downward is aligned with the inclined posture of the driving member. Thus, the slipping off posture is less likely to occur. Accordingly, the driving operation can be performed in a reliable and stable manner. Damages to the workpiece therefore can be prevented.

DETAILED DESCRIPTION

Figure 1:
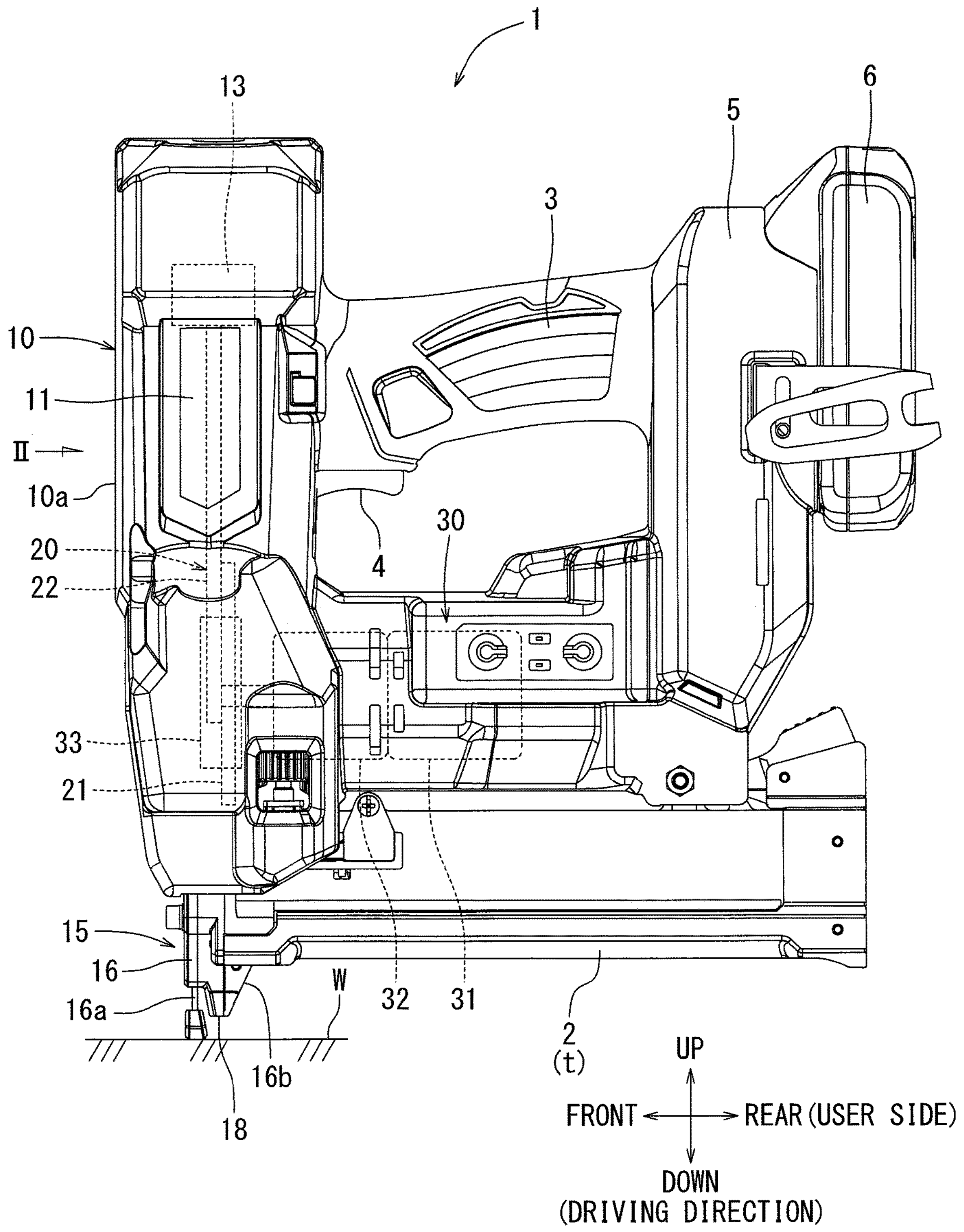
FIG. 1 is an overall side view of a driving tool according to an exemplary embodiment of the present disclosure.

The detailed description set forth below, when considered with the appended drawings, is intended to be a description of exemplary embodiments of the present disclosure and is not intended to be restrictive and/or representative of the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to another aspect of the present disclosure, the leg-guide groove extends over a range from an ejection port from which the driving member is ejected to a position of each leg of a shortest driving member that is supplied to the driving passage. Accordingly, the driving member in all sizes can be driven in the inclined posture in which the legs of the driving member enter the leg-guide grooves. This configuration prevents the driving member from being slipped off.

According to another aspect of the present disclosure, a distance between the leg-guide groove and the head-guide surface is set about 25% to 200% of a thickness of the driving member. The legs of the driving member having various thickness can enter the leg-guide groove, thereby reliably obtaining the inclined posture of the driving member preventing the driving member from being slipped off.

According to another aspect of the present disclosure, the driving tool also comprises a magazine from which the driving member is supplied to the driving passage. The driving tool also comprises a pusher that is housed in the magazine and that includes a recessed portion facing the driving passage for preventing the head of the driver member from contacting the pusher. Because of this configuration, since the head of the driving member is not pushed by the pusher, the inclined posture, in which the legs of the driving member are deviated toward a side of the first end surface, can be reliably obtained.

According to another aspect of the present disclosure, the driving tool also comprises a driver-guide groove that is formed in the driving passage and is between the pair of leg-guide grooves. The driver-guide groove is configured to guide the driver such that a projection formed on the driver engages the driver-guide groove. Because of this configuration, the driver can be firmly guided by the driver-guide groove. Also, the driver-guide groove can be arranged compact.

According to another aspect of the present disclosure, the driving tool also comprises a piston that is linked to the driver and moves in the driving direction owing to a pressure of a gas. The driving tool also comprises an electric motor, and a lifter that is rotated by the electric motor. The driver includes a plurality of engaged portions in the driving direction. Also, the plurality of engaged portions of the driver successively engage the lifter to return the driver to an initial position.

According to another aspect of the present disclosure, the driver includes a striking member that drives the driving member and also includes an engagement member that includes the plurality of engaged portions and that is overlappingly joined to the striking member. Because of this configuration, in a rechargeable air-spring type tacker, a manufacturing cost can be reduced to widen a striking member for enabling to drive a wider stable.

According to another aspect of the present disclosure, each of the leg-guide grooves has a rectangular shape in cross-section including a flat bottom surface. Because of this configuration, a processing cost of the leg-guide groove can be reduced.

According to another aspect of the present disclosure, the driving tool also comprises a base portion that is linked to the tool main body. The driving tool also comprises a driver guide that is linked to the base portion on a side of the first end surface of the tool main body. The driving passage is between the base portion and the driver guide. The head-guide surface and the leg-guide groove are formed on a surface of the driver guide facing the base portion Because of this configuration, the leg-guide grooves and the head-guide surface can be arranged compact in the driving nose. Thus, a configuration of the driving nose can be simplified.

Figure 2:
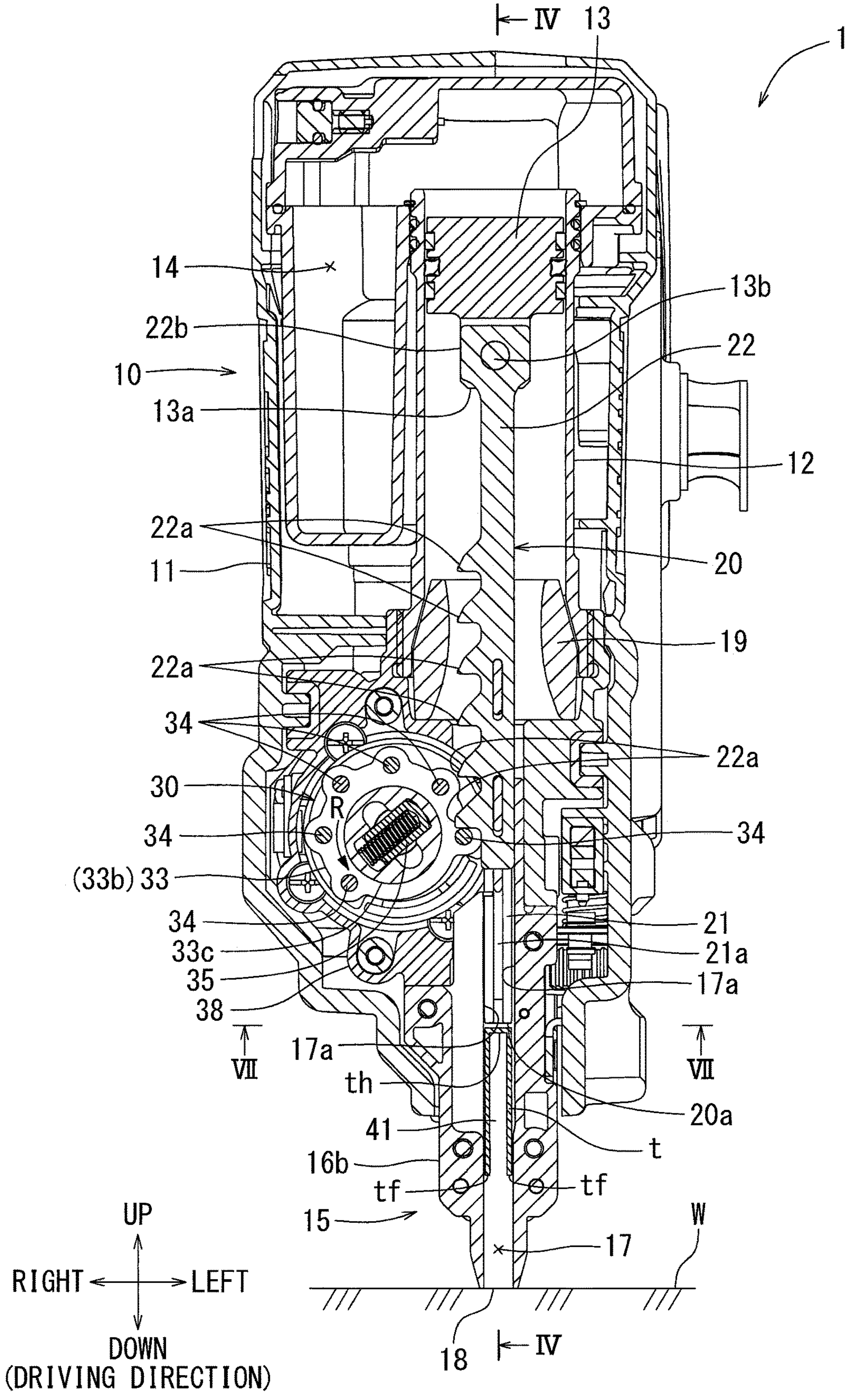
FIG. 2 is a front view of a driving nose of the driving tool viewed from a direction indicated by an arrow II of FIG. 1. This figure shows that a driver is at a standby position.
Figure 3:
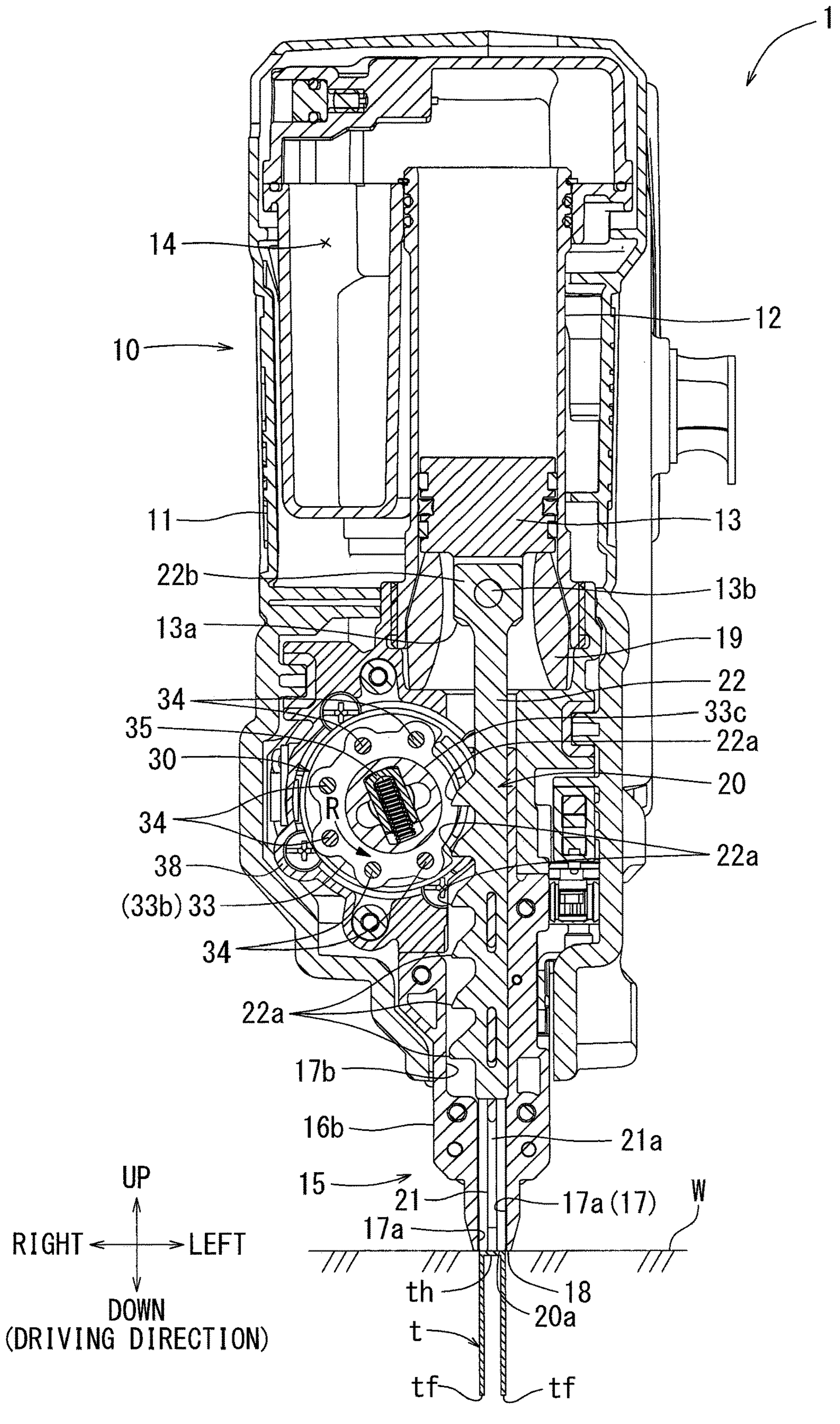
FIG. 3 is a front view of the driving nose of the driving tool viewed from the direction indicated by an arrow II of FIG. 1. This figure shows that the driver is at a lower end position.

Next, an embodiment according to the present disclosure will be described with reference to FIGS. 1 to 11. FIG. 1 shows an example of a driving tool 1, e.g. a rechargeable gas-spring type tacker that utilizes a gas filled in a chamber 14 above a cylinder 12 as a thrust power for driving a driving member t. As shown in FIGS. 2 and 3, for example, a U-shaped staple may be used for a driving member t. The driving member t may include a head th and two legs tf. Each of the two legs tf may extend in the same direction from a corresponding end of the head th. Thus, the two legs th may be in parallel to each other. The head th of the driving member t may be driven by a driver 20 that is discussed later in detail. The driving member t may be driven from the legs tf into a workpiece W.

In the following explanation, a driving direction of the driving member t is a downward direction, and a direction opposite to the driving direction is an upward direction. In FIG. 1, a user of the driving tool 1 may be generally situated on a rear side of the driving tool 1. The rear side of the driving tool 1 may be also referred to as a user side, and a side in a forward direction may be referred to as a front side. Also, a left and right side may be based on a user's position.

As shown in FIGS. 1-3, the driving tool 1 may include a tool main body 10. The tool main body 10 may include a front end surface 10*a*. The tool main body 10 may be configured to include a cylinder 12 that is housed in a rectangular tubular main body housing 11. A piston 13 may be housed within the cylinder 12, so as to be able to be reciprocated in an up-down direction. An upper portion of the cylinder 12 that is above the piston 13 may communicate with an accumulation chamber 14. A compression gas such as, for example, air, may be filled in the accumulation chamber 14. A pressure of a gas filled in the accumulation chamber 14 may act on an upper surface of the piston 13, thereby providing a thrust power for a driving operation.

A driving nose 15 may be provided at a lower portion of the tool main body 10. The driving nose 15 may include a driver guide 16 and a contact arm 16*a*. The driver guide 16 may be screw-connected to a front surface of a base portion 16*b* that is supported by a lower surface of the tool main body 10 in such a way that the driver guide 16 is overlapped with the front surface of the base portion 16*b*. A driving passage 17 may be provided between the driver guide 16 and the base portion 16*b*. The driving passage 17 may communicate with an inner peripheral side of the cylinder 12. The driving passage 17 may extend along the front end surface 10*a* (a first end surface) of the tool main body 10. The driver 20 that extends in the up-down direction may enter the driving passage 17, so as to be reciprocated in the up-down direction. When the contact arm 16*a* is pressed against a workpiece W and is relatively moved upward, a pull operation of a switch lever 4 may be effective.

Figure 4:
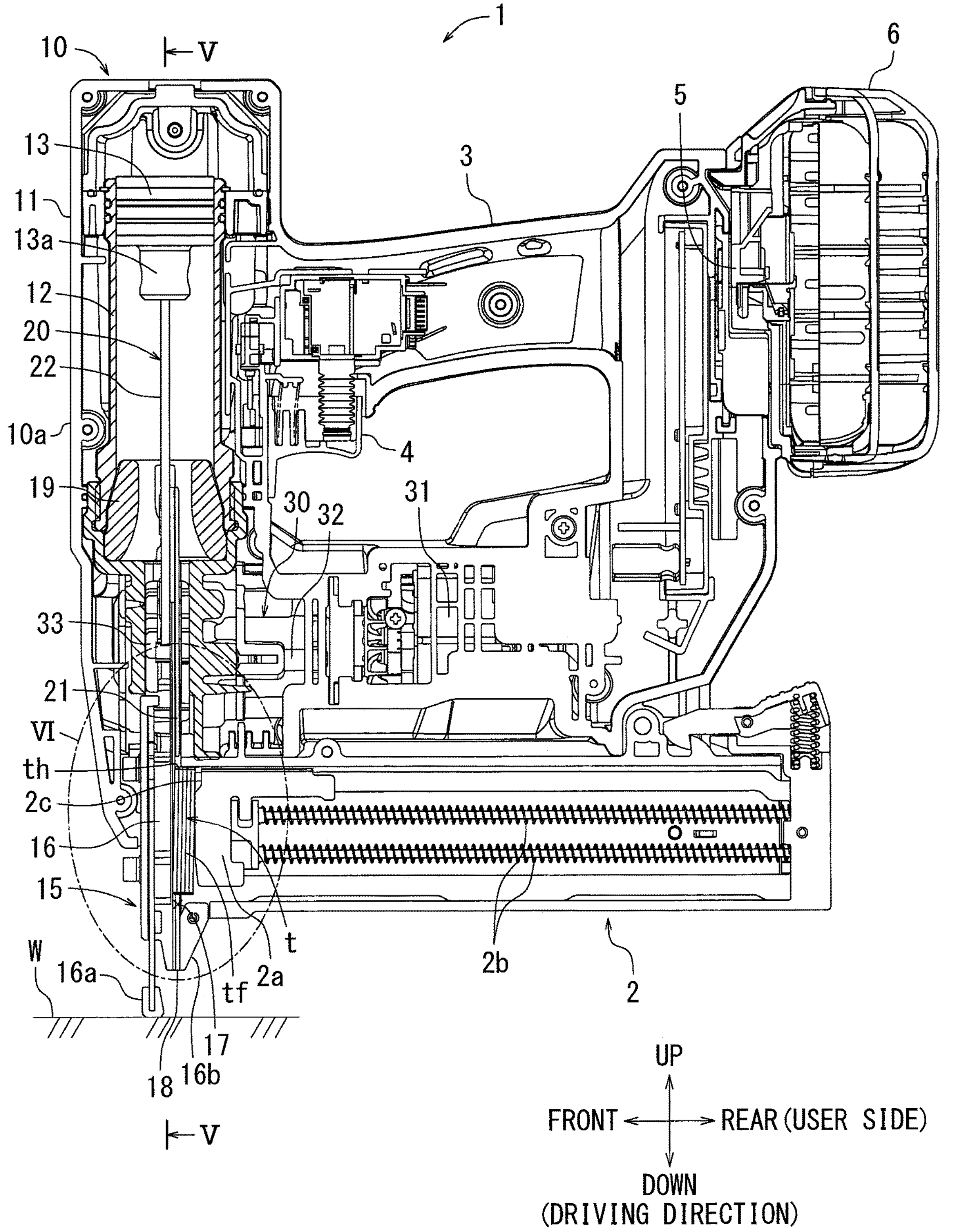
FIG. 4 is a longitudinal cross-sectional view of the driving tool.
Figure 5:
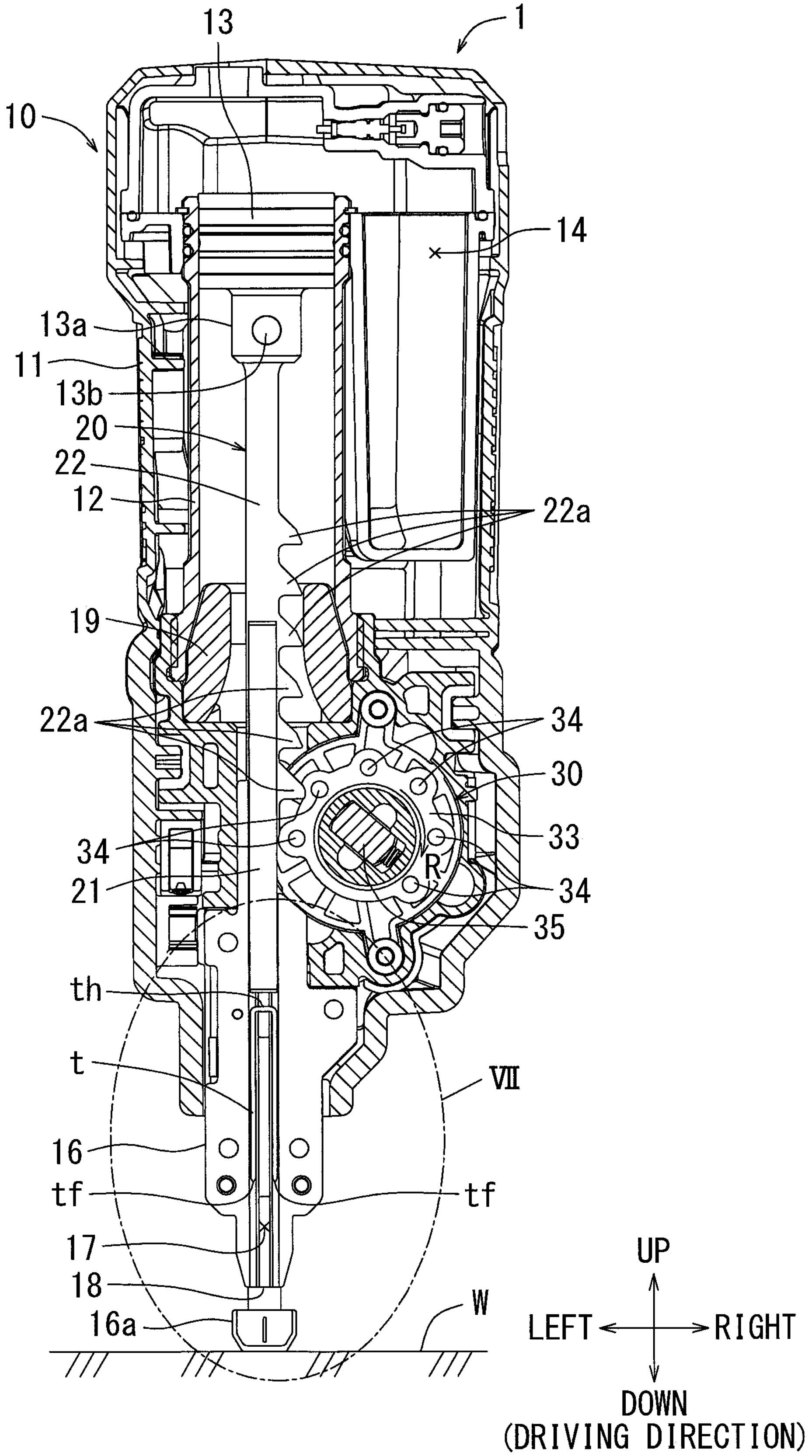
FIG. 5 is a cross-sectional view taken along line V-V of FIG. 4, showing a longitudinal cross-sectional view of a tool main body and the driving nose.

A magazine 2 may be linked to a rear surface side of the driving nose 15 (on a side opposite to the front end surface 10*a* of the tool main body 10). A plurality of driving members t may be loaded within the magazine 2. As shown in FIG. 4, the plurality of driving members t may be loaded as coupling driving members t that are placed in parallel to each other in a temporally connected manner. The plurality of driving members t may be pushed to a side of the driving passage 17 by a pusher 2*a* that is biased by a compression spring 2*b*. A recessed portion 2*c* may be formed in an upper portion of the pusher 2*a* to prevent from contacting the head th of the driving member t. Because of this configuration, the driving member t may be supplied to the driving massage 17 in such a way that the legs tf of the driving member t are mainly pushed by the pusher 2*a*. When the driver 20 is returned to a standby position (initial position), one driving member t may be supplied to within the driving passage 17. A head th of the driving member t that is supplied to the driving passage 17 may be driven by the driver 2 that moves downward.

As shown in FIG. 1, a grip 3, which is configured to be held by a user, may be arranged on a rear side of the tool main body 10. The switch lever 4, which is configured to be pulled by a fingertip of the user, may be arranged on a lower surface of a front portion of the grip 3. A battery attachment portion 5 may be arranged on a rear side of the grip 3. A battery pack 6 may be attached to a rear surface of the battery attachment portion 5. The battery pack 6 may be detachably attached to the battery attachment portion 5 by sliding the battery pack 6 in the up-down direction. The battery pack 6 may be removed from the battery attachment portion 5 to be repeatedly recharged by a dedicated charger for repeated use. The battery pack 6 may have general usefulness to be used as a power source for various electric tools. In the present disclosure, the battery pack 6 may serve as a power source for supplying power to an electric motor 31 in a lift mechanism 30, which is discussed in detail.

As shown in FIGS. 2 and 3, a lower end damper 19 for absorbing an impact of the piston 13 may be disposed on a lower side of the cylinder 12. A driver 20 may be connected to a center portion of the lower surface of the piston 13. The driver 20 may extend downward from the lower surface of the piston 13. A tip end side (a lower portion) of the driver 20 in the driving direction may enter a driving passage 17 through an inner peripheral side of the lower end damper 19. The driver 20 may move downward within the driving passage 17 owing to the pressure of the gas filled in the accumulation chamber 14, which is configured to act on the upper surface of the piston 13. The tip end (the lower portion) of the driver 20 that moves downward within the driving passage 17 may drive the head th of the driving member t that has been supplied to the driving passage 17. The driving member t that is driven by the driver 20 may be ejected from an ejection port 18 of the driving nose 15. The driving member t that is ejected from the ejection port 18 may be driven into the workpiece W.

As shown in FIG. 1, a lift mechanism 30 may be provided below the grip 3. The lift mechanism 30 may be arranged between a rear surface of the tool main body 10 and a lower portion of the battery attachment portion 5. The lift mechanism 30 may include the electric motor 31 for driving the lift mechanism 30. A lifter 33 may be arranged in front of the electric motor 31 via a reduction gear train 32. The lifter 33 may be supported by an output shaft 35 of the reduction gear train 32. The output shaft 35 of the reduction gear train 32 may be rotatably supported by a lifter housing 38 via a bearing. The lifter 33 may be housed in the lifter housing 38.

As shown in FIGS. 2 and 3, a plurality of engaged portions 22*a* may be formed on a right side of the driver 20. In the present disclosure, six engaged portions 22*a* are shown in the figures. The plurality of engaged portions 22*a* may be formed in a rack teeth shape projection in a rightward direction. The plurality of engaged portions 22*a* may be arranged at specified intervals in a longitudinal direction of the driver 20 (in the up-down direction). The lifter 33 in the lift mechanism 30 may engage the plurality of engaged portions 22*a*.

The lifter 33 may be arranged on the right side of the driver 20. The lifter 33 may include a plurality of engaging pins 34 (for example, six engaging pins 34), each of which is configured to successively engage a corresponding engaged portions 22*a* of the driver 20. A cylindrical shaft member may be used for each of the plurality of engaging pins 34. The plurality of engaging pins 34 may be arranged at specified intervals along an outer periphery of the lifter 33. As shown in FIGS. 3 and 4, the plurality of engaging pins 34 may be arranged in a specified area in and along a peripheral direction of the lifter 33. The plurality of engaging pins 34 may be arranged to cover an area of approximately three quarters of the circumference of the lifter 33. In other words, no engaging pins 34 may be disposed in a remaining portion of the peripheral portion of the lifter 33. In the following explanation, the area in which no engaging pins 34 is disposed may be referred to a recessed portion. When the recessed area faces a side of the driver 20, an engaging state of the lifter 33 with the engaged portions 22*a* of the driver 20 may be released. FIG. 2 shows a standby state immediately before the engaging state is released. FIG. 3 shows a driving state in which the engaging state has been released.

When the switch lever 4 is pulled, the electric motor 31 may be activated and the lifter 33 may rotate in a direction indicated by an arrow R in FIGS. 2 and 3 (in a counter-clockwise direction in FIGS. 2 and 3). After the driver 20 has reached a lower end position as shown in FIG. 3, each of the plurality of engaging pins 34 may successively engage a corresponding engaged portion 22*a* of the driver 20 from below by rotation of the lifter 33 in the direction indicated by the arrow R such that the driver 20 may be returned upward. The pressure of the gas filled in the accumulation chamber 14 may increase owing to an upward movement of the piston 13 by the lift mechanism 30. When the driver 20 is returned to the standby position (initial position) shown in FIG. 2, the electric motor 31 may stop and a sequence of the driving operation may be completed.

When the switch lever 4 is pulled again, the lift mechanism 30 may be activated again. The lifter 33 may rotate in the direction indicated by the arrow R in FIGS. 2 and 3. Accordingly an engagement of the lifter 33 with the engaged portions 22*a* may be released. Because of this configuration, the piston 13 and the driver 15 may move downward owing to the gas pressure filled in the accumulation chamber 14. The driver 20 may move downward in the driving passage 2*a*, thereby driving a driving member t. The driving member t that is ejected from the ejection port 18 may be driven into the workpiece W.

As shown in FIGS. 1 to 3, the driver 20 may have a two-member joining structure. In more detail, the driver 20 may be formed such that a striking member 21 is integrally joined to an engagement member 22. The striking member 21 and the engagement member 22 may be firmly joined, for example, by welding or a blazing method using a copper material. A connecting portion 22 that is connected to the piston 13 may be formed at an upper portion of the engagement member 22. The piston 13 may include a link portion 13*a* formed in a two forked shape. The link portion 13*a* may be at the center of the lower surface of the piston 13. The engagement member 22 may be inserted into the link portion 13*a*, and a link pin 13*b* may be inserted to holes formed in both the engagement member 22 and the link portion 13*b*. Because of this configuration, the engagement member 22 may be connected to the lower surface of the piston 13. The above-mentioned six engaged portions 22*a* may be formed on the right side of the engagement member 22.

As shown in FIG. 1, the striking member 21 may extend from approximately a center portion of the engagement member 22 in the longitudinal direction to the tip end of the driver 20 in the driving direction. The striking member 21 may have a band plate shape having a width slightly smaller than that of the engagement member 22 except the engaged portions 22*a*. A projection 21*a* may be formed on a front surface of the striking member 21. The projection 21*a* may be at a center portion in the width direction and may extend in the longitudinal direction of the striking member 21. The head th of the driving member t may be driven by a striking surface 20*a* of the tip end of the striking member 21.

As shown in FIGS. 2 and 3, a guide wall 17*a* and a recessed (relief) passage 17*b* may be formed within the driving passage 17. The striking member 21 may pass through the guide wall 17. The engagement member 22 may pass through the recessed passage 17*b*. The recessed passage 17*b* may be formed on the right side of the driving passage 17 (above the right side of the guide wall 17*a*).

Figure 6:
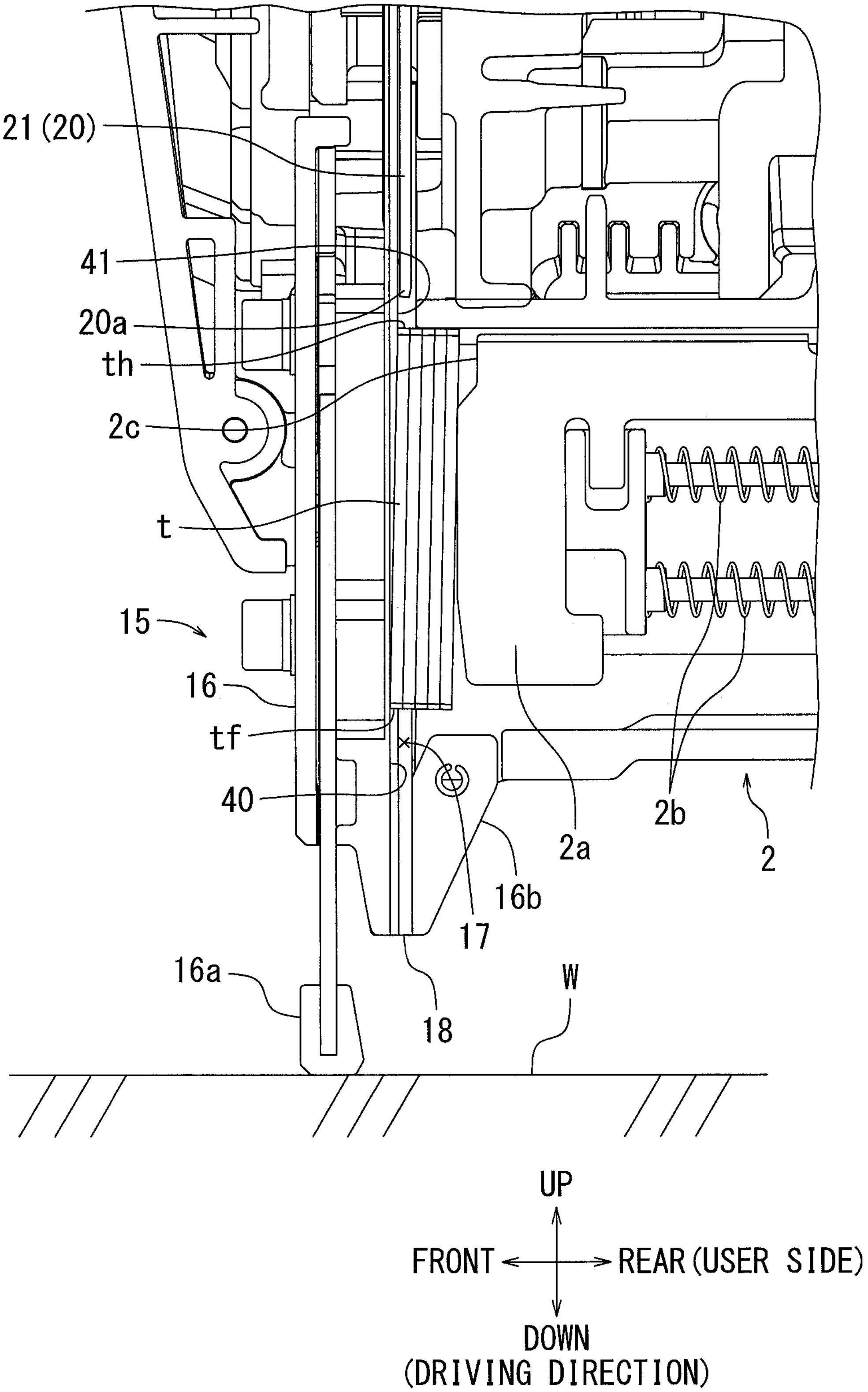
FIG. 6 is an enlarged view of a part VI of FIG. 4.
Figure 7:
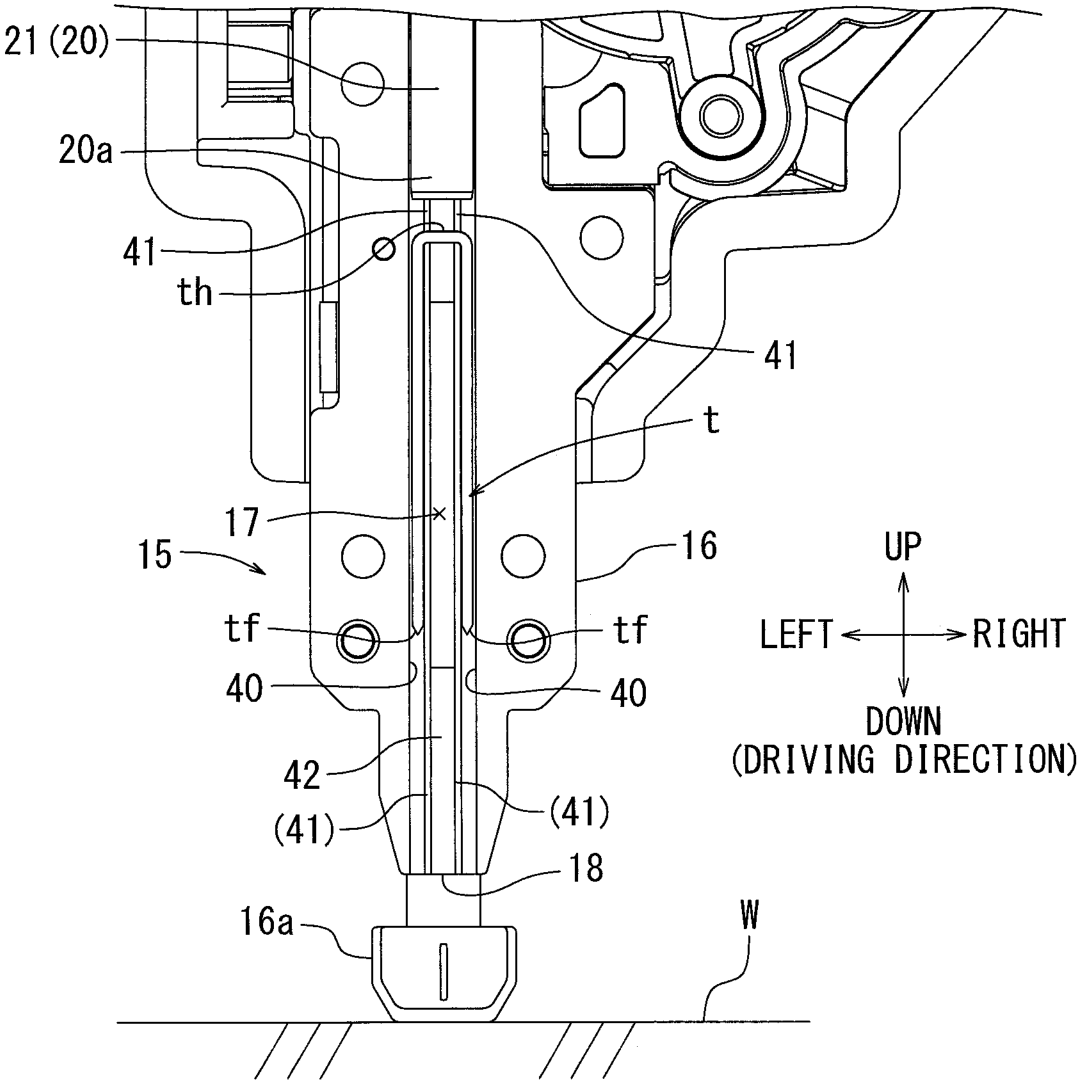
FIG. 7 is an enlarged view of a part VII of FIG. 5.
Figure 8:
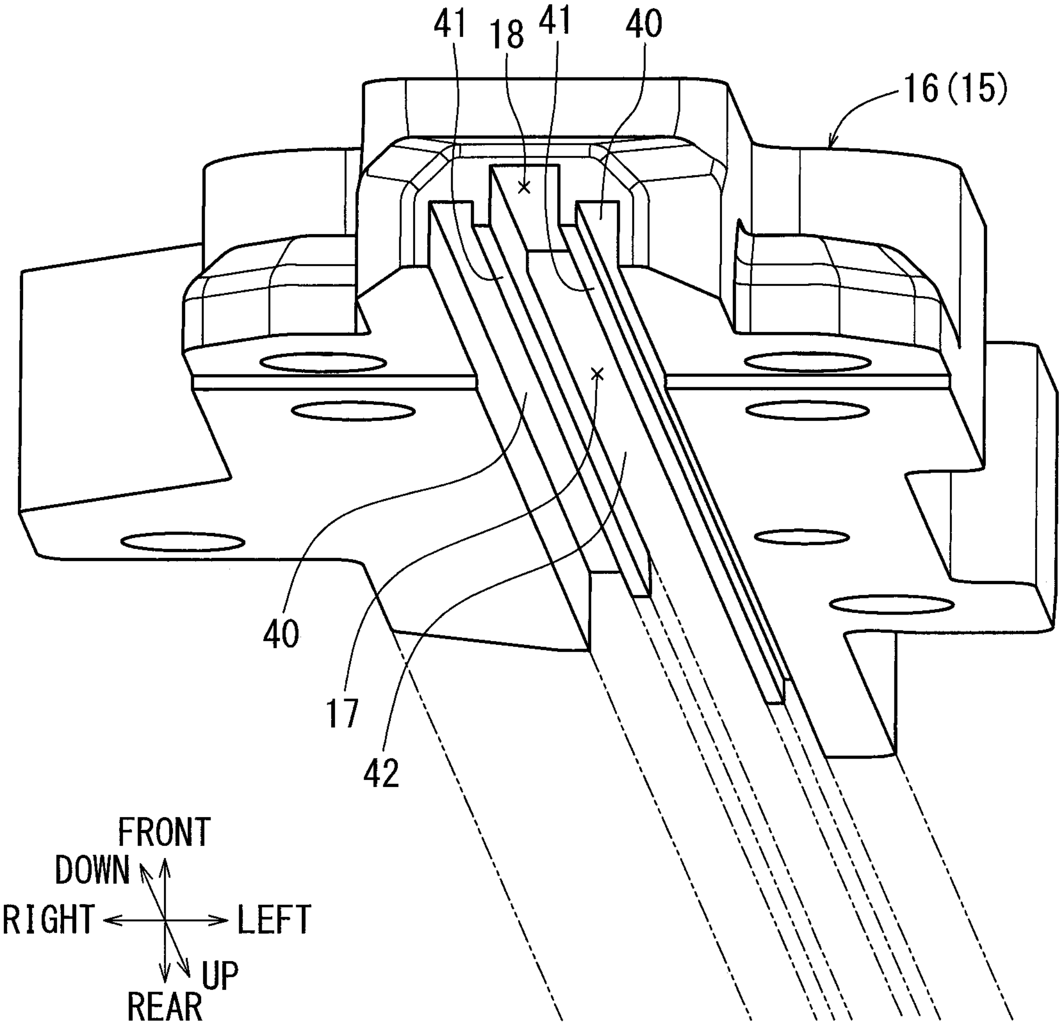
FIG. 8 is a perspective view of a driver guide of the driving tool, which is viewed from a diagonally lower rear side.
Figure 9:
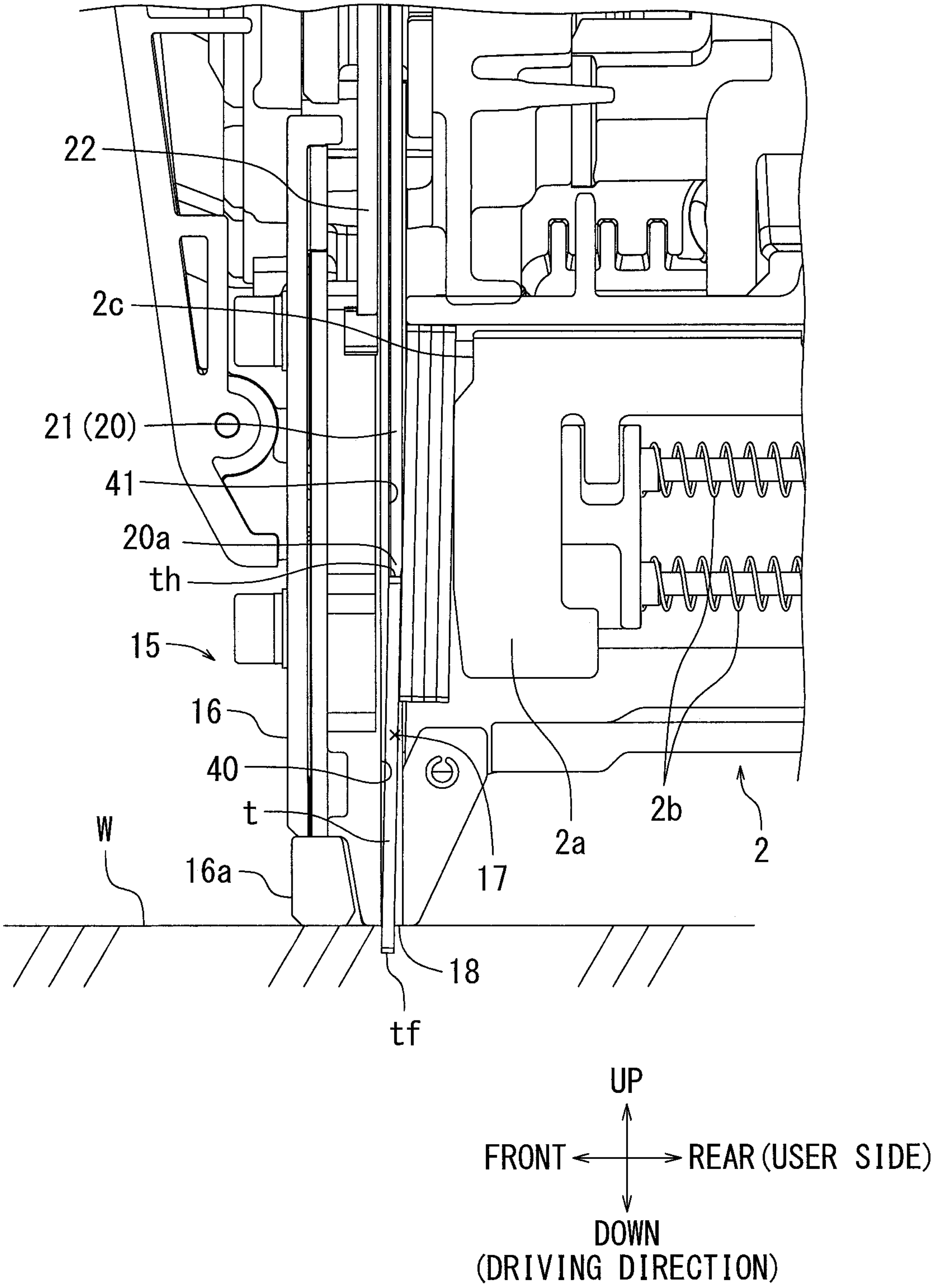
FIG. 9 is a longitudinal cross-sectional view of the driving nose. This figure shows a state in which a driving member is ejecting. In more detail, this figure shows that tip ends of both legs of the driving member are being driven into a workpiece.

As shown in FIGS. 6-8, a pair of leg-guide grooves 40 for guiding legs tf of the driving member t may be formed on the front surface of the driving passage 17. The two legs tf of the driving member t may enter the pair of leg-guide grooves 40. Each of the leg-guide grooves 40 may be recessed on the side of the front end surface 10*a* of the tool main body 10. Each of the leg-guide grooves 40 may be in a rectangular shape in cross section including a flat bottom surface. The leg-guide grooves 40 may be in parallel with each other. Each leg-guide groove 30 may be configured such that an upper end portion of the guide groove 30 is positioned corresponding to a supply position (i.e., positioned above a supply position) of a shortest driving member t that can be loaded with the magazine 2. Because of this configuration, both tip ends of the legs tf of the driving member t, which has any length only if it can be loaded with the magazine 2 (in other words, including the longest driving member t and the shortest driving member t that can be loaded with the magazine 2), may enter the lag-guide grooves 40. A lower end portion of the leg-guide grooves 30 may reach the ejection port 18.

As shown in FIG. 8, a pair of head-guide surfaces 41, each of which is positioned in a rearward direction relative to the pair of leg-guide grooves 40, may be formed between the pair of leg-guide grooves 40. The pair of head-guide surfaces 41 may be apart from each other at a specified distance in the left-right direction and may extend along the entirety of the driving passage 17. The head-guide surfaces 41 may be in parallel with each other. The head th of the driving member t, which is supplied to the driving passage 17 from the magazine 2, may straddle between and slidably contact the pair of head-guide surfaces 41. In the present disclosure, the leg-guide grooves 40 and the head-guide surfaces 41 may be formed on a side of the facing surface (rear surface) of the driver guide 16 with respect to the base portion 16*b*.

As shown in FIGS. 6 and 7, the driving member t may be supplied to the driving passage 17 such that the head th of the driving member t contacts the head-guide surface 41 and both ends of the legs th of the driving member t enter the leg-guide grooves 40. Accordingly, as shown in FIG. 6, the driving member t may be supplied to the driving passage 17 in an inclined posture in which a tip end of each leg th of the driving member t is deviated in the forward direction relative to the head th of the driving member t. The driving member t may be supplied to the driving passage 17 such that the legs th, instead of the head th, are directly pushed by the pusher 2*a*, since the recessed portion 2*c* is formed in an upper front portion of the pusher 2*a*. Because of this configuration, the inclined posture of the driving member t in the driving passage 17 may be obtained in a reliable manner. The driving member t that is held in the inclined posture may be driven by the driver 20.

A distance between the head-guide surface 41 and the leg-guide groove 40 in the front-rear direction (a depth of the leg-guide groove 40) may be set 25% to 200% of a thickness of the driving member t, for example, to be equal to the thickness of the driving member t. Because of this configuration, the driving member t that is held in the inclined posture relative to a downward direction of the driver 20 may be obtained in a reliable manner.

As shown in FIG. 8, a driver-guide groove 42, which is positioned in the forward direction relative to the pair of leg-guide groove 40, may be formed between the pair of head-guide surfaces 41. The protrusion 21*a* formed on the front surface of the striking member 21 may enter the driver-guide groove 42. Because of this configuration, the striking member 21 of the driver 20 may be guided within the driving passage 17 in the up-down direction.

The inclined posture of the driving member t may correspond to an inclined posture in which the tip side of each leg th of the driving member t is deviated in the forward direction (toward a side of the front end surface 10*a* of the tool main body 10) relative to the head th of the driving member t with respect to a direction in which the driver 20 moves downward (the driving direction).

Figure 10:
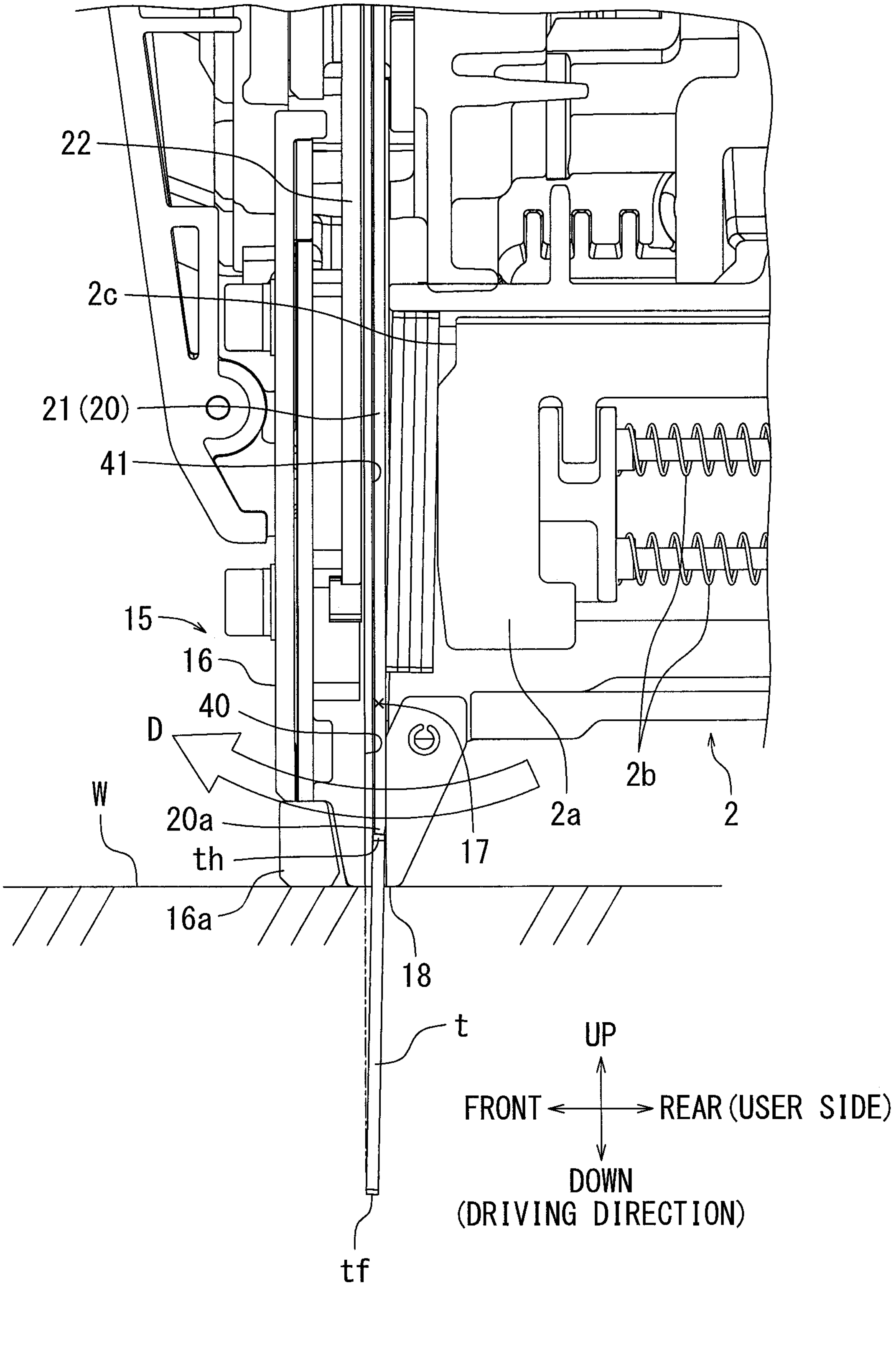
FIG. 10 is a longitudinal cross-sectional view of the driving nose. This figure shows that the driving tool is tilted such that the driving nose is moved in a direction indicated by an arrow D owing to a reaction force when the driving operation is performed.

As shown in FIG. 10, when a driving of the driving member t advances, the driving tool 1 may move in a direction in which the driving tool 1 is raised owing to a reaction force of the driving of the driving member t. In this case, the driving tool 1 may be slightly raised in a direction in which the driving nose 15 is tilted in the forward direction (in a direction indicated by an arrow D of FIG. 10), since an upper portion of the driving tool 1 above a gravity center of the driving tool 1 may be tilted in the rearward direction owing to the reaction force of the driving of the driving member t. FIG. 10 shows a state before the driving tool 1 is raised. Thus, FIG. 10 shows that the driving member t is still held in the inclined posture relative to an extension line of the bottom surface of the leg-guide groove 40 (dashed line in FIG. 10). In FIG. 10, the dashed line may be in parallel with the direction in which the driver 20 moves downward. Accordingly, a driving of the driving member t may advance in the inclined posture in which the driving member t is inclined relative to the direction in which the driver 20 moves downward.

Figure 11:
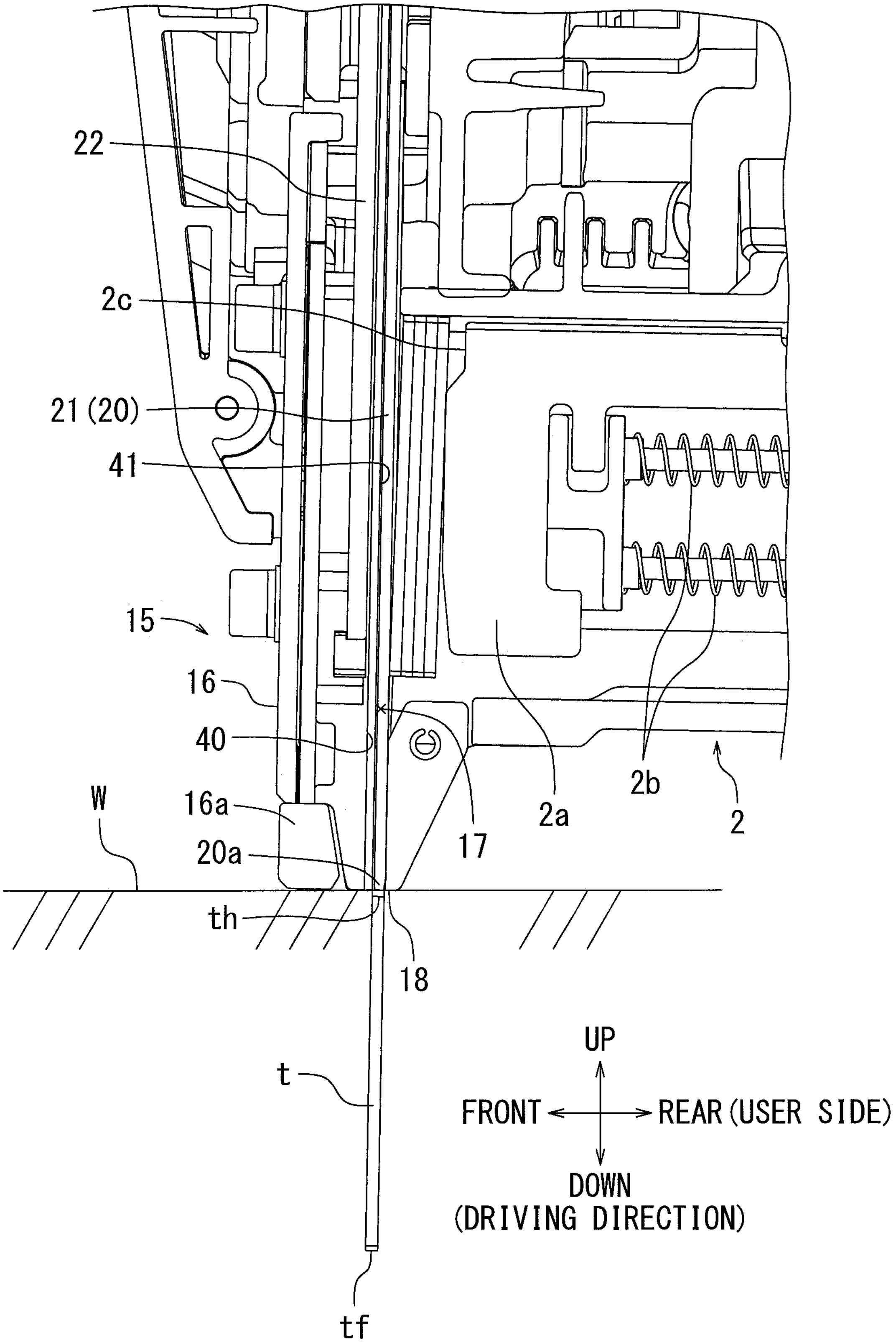
FIG. 11 is a longitudinal cross-sectional view of the driving nose. This figure shows that the driving member is completely driven into the workpiece by the tilted driving tool.

Referring to FIG. 10, when the reaction force as described above occurs, the head th of the driving member t has been guided in the driving passage 17. The driving tool 1 may be tilted in the direction indicated by the arrow D owing to the reaction force occurred when the driving member t is driven. Accordingly, a direction in which the driver 20 moves downward may be approximately aligned with a direction of the driving member t that is driven in the inclined posture. Thus, the direction in which the driver 20 moves downward may be prevented from deviating from the driven direction of the driving member t. FIG. 11 shows this state. The driving of the driving member t may advance in a direction in which the driver 20 moves downward is approximately aligned with a longitudinal direction of the legs tf of the driving member t.

As shown in FIG. 11, the driver 20 may reach the lower end position to drive the driving member t into the workpiece W in a state in which the driving nose 15 is slightly tilted. Since the direction in which the driver 20 moves downward is approximately aligned with a longitudinal direction of the legs tf of the driving member t, a slipping off posture as mentioned above, in which the striking surface 20*a* of the driver 20 is deviated from (come off) the head th of the driving member t when a driving operation is performed, can be prevented. Because of this configuration, the driving member t can be driven in a reliable manner. Also, the workpiece W can be prevented from being directly damaged by the driver 20.

According to the embodiment as described above, the pair of leg-guide grooves 40, which the legs tf of the driving member t enter, and the head-guide surface 41, which the head th of the driving member t slidably contacts, are formed in the driving passage 17. Because of this configuration, a driving member t that is supplied to the driving passage 17 may be ejected from the ejection port 18 in the inclined posture in which both tip ends of the legs th of the driving member t are deviated toward a side of the front end surface (first end surface) 10*a* of the tool main body 10.

Then, the ejection port 18 may be moved toward the side of the front end surface (first end side) 10*a* (in the direction indicated by an arrow D of FIG. 10) owing to the reaction force occurred when the driving member t is ejected. When the reaction force occurs, the head th of the driving member t may be held in the driving passage 17. Accordingly, a driving of the driving member t may advance in a direction in which the driver 20 moves downward is aligned with the longitudinal direction of the legs tf of the driving member t. This configuration prevents the driving member from being slipped off. Thus, a driving operation may be performed in a reliable manner and a stable driving operation can be performed. Also, a damage of the workpiece W can be prevented.

According to the above-described embodiment, the leg-guide guide grooves 40 may be positioned above both tip ends of the legs tf of the shortest driving member t that is supplied to the driving passage 17. Accordingly, a driving member t in all sizes may be driven in the inclined posture in which the legs tf of the driving member t enter the leg-guide grooves 40. Because of this configuration, the slipping off posture can be prevented from occurring with respect to the driving member t in all sizes.

According to the above-described embodiment, the depth of the leg-guide groove 40 may be set 25% to 200% of the thickness of the driving member t. Accordingly, the legs th of the driving member t having various thicknesses may enter the leg-guide grooves 40, thereby reliably obtaining a inclined posture of the driving member t. Thus, the slipping off posture can be prevented from occurring in a reliable manner.

According to the above-described embodiment, the recessed portion 2*c* for preventing the head th of the driving member t from contacting the pusher 2*a* may be formed in the pusher 2*a* of the magazine 2. Accordingly, since the head th of the driving member t is not pushed by the pusher 2*a*, the inclined posture, in which the legs th of the driving member t are deviated toward a side of the front surface of the driving passage 17 (toward the side of the first end surface 10*a* of the tool main body 10, can be reliably obtained.

According to the above-described embodiment, the driver-guide groove 42 for guiding the driver 20 in the driving direction may be formed between the pair of leg-guide grooves 40. Because of this configuration, the driver 20 may be firmly guided in the driving direction by the driver-guide groove 42. Also, the driver-guide groove 41 may be arranged compact.

According to the above-described embodiment, the driving tool 1 may include the piston 13 that moves in the driving direction owing to the gas pressure, and the driver 20 may be linked to the piston 13. Accordingly, the slipping off posture can be avoided from occurring in a driving tool such as a rechargeable air-spring type tacker or an air tacker, both of which a driving member t is driven by a compressed gas.

According to the above-described embodiment, the driver 20 may include a plurality of engaged portions 22*a* arranged in the driving direction. The lifter 33 that is rotated by the electric motor 31 may successively engage a corresponding engaged portion 22*a* of the driver 20, thereby returning the driver 20 to the initial position. Accordingly, the slipping off posture can be avoided in a rechargeable air-spring type tacker.

According to the above-described embodiment, the driver 20 may include the striking member 21, which drives the driving member t, and the engagement member 22 which includes a plurality of engaged portions 22*a* and overlappingly joined to the striking member 21. Accordingly, in a rechargeable air-spring type tacker, a manufacturing cost may be reduced to widen a striking member 21 for enabling to drive a wider stable.

According to the above-described embodiment, the leg-guide groove 40 may be in a rectangular shape in cross section including a flat bottom surface. Accordingly, a processing cost of the leg-guide groove 40 can be reduced.

According to the above-described embodiment, a side of the front surface of the base portion 16*b* that is joined to a lower surface of the tool main body 10 may be overlappingly linked to the driver guide 16, thereby forming the driving passage 17 between the base portion 16*b* and the driver guide 16. The leg-guide grooves 40 and the head-guide surfaces 41 may be formed in the overlapping surface of the driver guide 16 (in a front surface of the driving passage 17). Accordingly, the leg-guide grooves 40 and the head-guide surfaces 41 may be arranged compact in the driving nose 15. Thus, a configuration of the driving nose 15 can be simplified.

The embodiment discussed above may be modified in various ways. In the above-exemplified embodiment, the driver 20 may be configured to have a two-member joining structure in which the engagement member 22 is joined to the front side of the striking member 21. However, the above-described guide structure for the driving member t can be applied to a driver in which the plurality of engaged portions are integrally formed on a lateral side of the striking member t.

In the above-exemplified embodiment, a rechargeable gas-spring type tacker that utilizes a gas pressure as a thrust power for driving a driving member t may be exemplified as a driving tool 1. However, the above-described guide structure for the driving member t can be applied to a rechargeable mechanical-spring type tacker that utilizes a biasing force of the compression spring as a thrust power for driving a driving member t.

The driver-guide groove 42 can be omitted.

The length between the leg-guide groove 40 and the head-guide surface 41 (a depth of the leg-guide groove 40) may be changed within a range between 25% and 200% of a thickness of the driving member t. The depth of the leg-guide groove 40 can be set in an appropriate manner according to a reaction force occurred when the driving member t is driven, thereby avoiding the slipping off posture in a reliable manner.

The driving tool 1 in the embodiment may be one example of the driving tool according to one aspect or other aspects of the present disclosure. The tool main body 10 in the embodiment may be one example of the tool main body according to according to one aspect or other aspects of the present disclosure. The front end surface 10*a* in the embodiment may be one example of the first end surface according to one aspect or other aspects of the present disclosure. The driving member t in the embodiment may be one example of the driving member according to one aspect or other aspects of the present disclosure. The driving passage 17 in the embodiment may be one example of the driving passage according to one aspect or other aspects of the present disclosure.

The driver 20 in the embodiment may be one example of the driver according to one aspect or other aspects of the present disclosure. The head th in the embodiment may be one example of the head according to one aspect or other aspects of the present disclosure. The head-guide surface 41 in the embodiment may be one example of the head-guide surface according to one aspect or other aspects of the present disclosure. The leg tf in the embodiment may be one example of the leg according to one aspect or other aspects of the present disclosure. The leg-guide groove 40 in the embodiment may be one example of the leg-guide groove according to one aspect or other aspects of the present disclosure.

What is claimed is:

1. A driving tool comprising:
a tool main body including a first end surface;
a driving passage extending along the first end surface of the tool main body in a driving direction into which a U-shaped driving member having a head and two legs is supplied from a direction opposite to the first end surface;
a driver configured to move along the driving passage for driving the driving member;
a head-guide surface formed in the driving passage, the head-guide surface slidably guiding the head of the driving member; and
a pair of leg-guide grooves, each of the pair of leg-guide grooves being configured to be recessed from the head-guide surface toward a side of the first end surface of the tool main body and extend parallel to the driving direction along an entirety of the driving passage such that the two legs of the driving member enter the pair of leg-guide grooves so as to be non-parallel to the driving direction.

2. The driving tool according to claim 1, wherein,
the leg-guide groove extends over a range from an ejection port from which the driving member is ejected to a position of each leg of a shortest driving member supplied into the driving passage.

3. The driving tool according to claim 1, wherein,
a distance between each of the leg-guide grooves and the head-guide surface is set to be in a range of 25% to 200% of a thickness of the driving member.

4. The driving tool according to claim 1, further comprising:
a magazine feeding the driving member into the driving passage; and
a pusher housed within the magazine for pushing the driving member toward a side of the driving passage, the pusher including a recessed portion facing the driving passage for preventing the head of the driving member from contacting the pusher.

5. The driving tool according to claim 1, further comprising:
a driver-guide groove formed in the driving passage and located in between the pair of leg-guide grooves, wherein,
the driver-guide groove is configured to guide the driver in the driving direction such that a projection formed on the driver engages the driver-guide groove.

6. The driving tool according to claim 5, wherein the driver-guide groove is recessed toward the first end surface rather than the pair of leg-guide grooves along the entirety of the driving passage.

7. The driving tool according to claim 1, further comprising:
a piston linked to the driver and configured to move in the driving direction owing to a pressure of a gas;
an electric motor; and
a lifter rotated by the electric motor, wherein:
the driver includes a plurality of engaged portions in the driving direction; and
the plurality of engaged portions of the driver engages the lifter to return the driver to an initial position.

8. The driving tool according to claim 7, wherein,
the driver includes (i) a striking member driving the driving member and (ii) an engagement member including the plurality of engaged portions, the engagement member being overlappingly joined to the striking member.

9. The driving tool according to claim 1, wherein,
each of the leg-guide grooves has a rectangular shape in cross-section including a flat bottom surface.

10. The driving tool according to claim 1, further comprising:
a base portion linked to the tool main body; and
a driver guide linked to the base portion on a side of the first end surface of the tool main body, wherein:
the driving passage is between the base portion and the driver guide; and
the head-guide surface and the leg-guide groove are formed on a surface of the driver guide facing the base portion.

11. The driving tool according to claim 1, wherein the head-guide surface and the pair of leg-guide grooves are configured such that the two legs of the driving member are tilted toward the first end surface of the tool main body with regard to the driving direction along the entirety of the driving passage.

12. A driving tool comprising:
a tool main body including a first end surface and a base portion;
a driver nose including a driver guide configured to connect a front surface of the base portion, the driver guide overlapping with the front surface of the base portion;
a driving passage extending in a driving direction at which a driving member is provided in a direction opposite to the first end surface, the driving member further comprising a head and two legs;
a pusher having a recessed portion configured to face the driving passage for preventing the head of the driving member from contacting the pusher;
a driver configured to move along the driving passage for driving the driving member, the driver further comprising a plurality of engaged portions formed on a right side of the driver, each of the plurality of engaged portions being arranged at a specified interval in a longitudinal direction of the driver;

a lifter arranged on a right side of the driver, the lifter comprises a plurality of engaging pins, each of the plurality of engaging pins is arranged at a specified interval along an outer peripheral portion of the lifter, the plurality of engaging pins covering three quarters of a circumference of the lifter;

a head-guide surface formed in the driving passage, the head-guide surface slidably guiding the head of the driving member;

a pair of leg-guide grooves, each of the pair of leg-guide grooves being configured to recess from the head-guide surface toward a side of the first end surface and extend parallel to the driving direction along an entirety of the driving passage, the two legs of the driving member entering the pair of leg-guide grooves so as to be non-parallel to the driving direction; and a driver-guide groove formed in the driving passage and allocated between the pair of leg-guide grooves.

13. The driving tool according to claim 12, further comprising a tubular main body housing, wherein the tubular main body housing is rectangular-shaped.

14. The driving tool according to claim 12, further comprising a cylinder being housed within the tool main body.

15. The driving tool according to claim 14, further comprising a piston being housed within the cylinder.

16. The driving tool according to claim 12, wherein each of the plurality of engaging pins of the lifter is configured to successively engage a corresponding one of the plurality of engaged portions of the driver.

17. The driving tool according to claim 12, wherein the outer peripheral portion of the lifter further comprises a recessed portion for releasing the lifter from engaging the plurality of engaged portions of the driver.

18. The driving tool according to claim 12, wherein the driver further comprises a striking member and an engagement member, wherein the striking member is configured to integrally join the engagement member to form a two-member joining structure.

19. A driving tool comprising:

a tool main body including a first end surface and a base portion;

a driver nose including a driver guide configured to connect a front surface of the base portion, the driver guide overlapping with the front surface of the base portion;

a driving passage extending in a driving direction at which a driving member is provided at a direction opposite to the first end surface, the driving member further comprising a head and two legs;

a pusher having a recessed portion configured to face the driving passage for preventing the head of the driving member from contacting the pusher;

a driver configured to move along the driving passage for driving the driving member, the driver further comprising a plurality of engaged portions formed on a right side of the driver, each of the plurality of engaged portions being arranged at a specified interval in a longitudinal direction of the driver;

a lift mechanism having a lifter, the lifter comprises a plurality of engaging pins, each of the plurality of engaging pins being arranged at a specified interval along an outer peripheral portion of the lifter, the plurality of engaging pins covering three quarters of a circumference of the lifter;

a head-guide surface formed in the driving passage, the head-guide surface slidably guiding the head of the driving member;

a pair of leg-guide grooves, each of the pair of leg-guide grooves being configured to recess from the head-guide surface toward a side of the first end surface and extend parallel to the driving direction along an entirety of the driving passage, the two legs of the driving member entering the pair of leg-guide grooves so as to be non-parallel to the driving direction; and a driver-guide groove formed in the driving passage and allocated between the pair of leg-guide grooves.

20. The driving tool according to claim 19, wherein the lift mechanism further comprises an electric motor for driving the lift mechanism and a reduction gear train having an output shaft for supporting the lifter.

* * * * *